(12) United States Patent
Tanimoto et al.

(10) Patent No.: US 11,989,474 B2
(45) Date of Patent: *May 21, 2024

(54) IMAGE PROCESSING APPARATUS

(71) Applicant: BROTHER KOGYO KABUSHIKI KAISHA, Nagoya (JP)

(72) Inventors: Satoshi Tanimoto, Nagoya (JP); Yuichiro Sakuragi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,421

(22) Filed: Nov. 8, 2022

(65) Prior Publication Data

US 2023/0161532 A1 May 25, 2023

(30) Foreign Application Priority Data

Nov. 25, 2021 (JP) ................. 2021-190730

(51) Int. Cl.
*G06F 3/12* (2006.01)
(52) U.S. Cl.
CPC .......... *G06F 3/1273* (2013.01); *G06F 3/1207* (2013.01); *G06F 3/1289* (2013.01)
(58) Field of Classification Search
None
See application file for complete search history.

(56) References Cited

U.S. PATENT DOCUMENTS

| 8,520,247 B1* | 8/2013 | Takaishi | G06F 3/1222 |
| | | | 358/1.18 |
| 8,625,126 B2* | 1/2014 | Yasuhara | G06F 21/78 |
| | | | 358/1.14 |
| 9,001,360 B2* | 4/2015 | Sato | G06F 3/129 |
| | | | 358/1.15 |
| 2006/0193001 A1* | 8/2006 | Ii | H04N 1/32662 |
| | | | 358/1.15 |
| 2009/0109477 A1* | 4/2009 | Oomura | G06F 3/1288 |
| | | | 358/1.15 |
| 2011/0032563 A1* | 2/2011 | Matsuzawa | G06F 3/1222 |
| | | | 358/1.15 |
| 2012/0105908 A1* | 5/2012 | Tsutsumi | G06F 3/121 |
| | | | 358/1.15 |

FOREIGN PATENT DOCUMENTS

JP 2010-160698 A 7/2010

* cited by examiner

*Primary Examiner* — Fan Zhang
(74) *Attorney, Agent, or Firm* — Scully, Scott, Murphy & Presser, PC

(57) ABSTRACT

An image processing apparatus comprising a scanner. When the apparatus starts execution of a file output job, the apparatus confirms whether or not to be able to access a server. In a case where the apparatus could not access the server, the apparatus stops the execution of the file output job without outputting a file including image data to a designated output destination. In a case where the apparatus could access the server, the apparatus transmits a log relating to the file output job to the server before outputting the file to the designated output destination. When the transmitted log could be saved in the server, the apparatus outputs the file to the designated output destination. When the transmitted log could not be saved in the server, the apparatus stops the execution of the file output job without outputting the file to the designated output destination.

9 Claims, 10 Drawing Sheets

IMAGE PROCESSING APPARATUS

REFERENCE TO RELATED APPLICATIONS

This application claims priority from Japanese Patent Application No. 2021-190730 filed on Nov. 25, 2021. The entire content of the priority application is incorporated herein by reference.

BACKGROUND ART

It is known that an image processing apparatus executes image processing based on image data. The image processing apparatus is configured, when a job including image processing is executed, to save a log relating to the job in a server. It is also known that a system includes a complex machine and a server. The complex machine monitors a job such as copying and scanning of documents to acquire a log thereof, and transmits the acquired log to the server. The server saves the log.

DESCRIPTION

In the system explained above, a log of a job including a scan is transmitted to the server. In a case of executing a job including the scan, it might be required to securely leave a log thereof. In this case, it was necessary to improve the procedure for saving the log.

An aspect of the present disclosure is an image processing apparatus including a scanner, in which the image processing apparatus is configured to execute a file output job, in which the file output job is a job of reading a plurality of pages of a document by the scanner, of generating image data of the plurality of pages based on the read document, and of outputting a file including the generated image data to a designated output destination, in which the image processing apparatus is configured to save a log relating to the file output job in a server, in a case where the image processing apparatus executes the file output job, and in which the image processing apparatus is configured to: confirm whether or not to be able to access the server, in response to receiving an execution instruction of the file output job via an input interface of the image processing apparatus; stop execution of the file output job without outputting the file to the designated output destination, in a case where it is confirmed that the image processing apparatus could not access the server; transmit the log relating to the file output job to the server before outputting the file including the generated image data to the designated output destination, in a case where it is confirmed that the image processing apparatus could access the server; output the file including the generated image data to the designated output destination, in a case where the transmitted log could be saved in the server; and stop the execution of the file output job without outputting the file to the designated output destination, in a case where the transmitted log could not be saved in the server.

The image processing apparatus disclosed herein performs access confirmation to the server before outputting a file, in response to receiving the execution instruction of the file output job, stops the file output job when it is confirmed that the image processing apparatus could not access the server, and also stops the file output job even when the log could not be saved. Therefore, it is possible to reduce a situation where even though a file output job has been executed, the log relating to the file output job is not saved in the server.

A control method for implementing the function of the image processing apparatus, a computer program and a computer-readable storage medium having the program stored thereon are also novel and useful.

According to the technology disclosed herein, when the image processing apparatus executes a job including a scan, the image processing apparatus enables to transmit a log relating to the job to the server in a favorable procedure.

Hereinafter, a complex machine (hereinafter, referred to as 'MFP') according to an embodiment will be described in detail with reference to the accompanying drawings. The MFP has an image processing function and a communication function.

Figure 1:
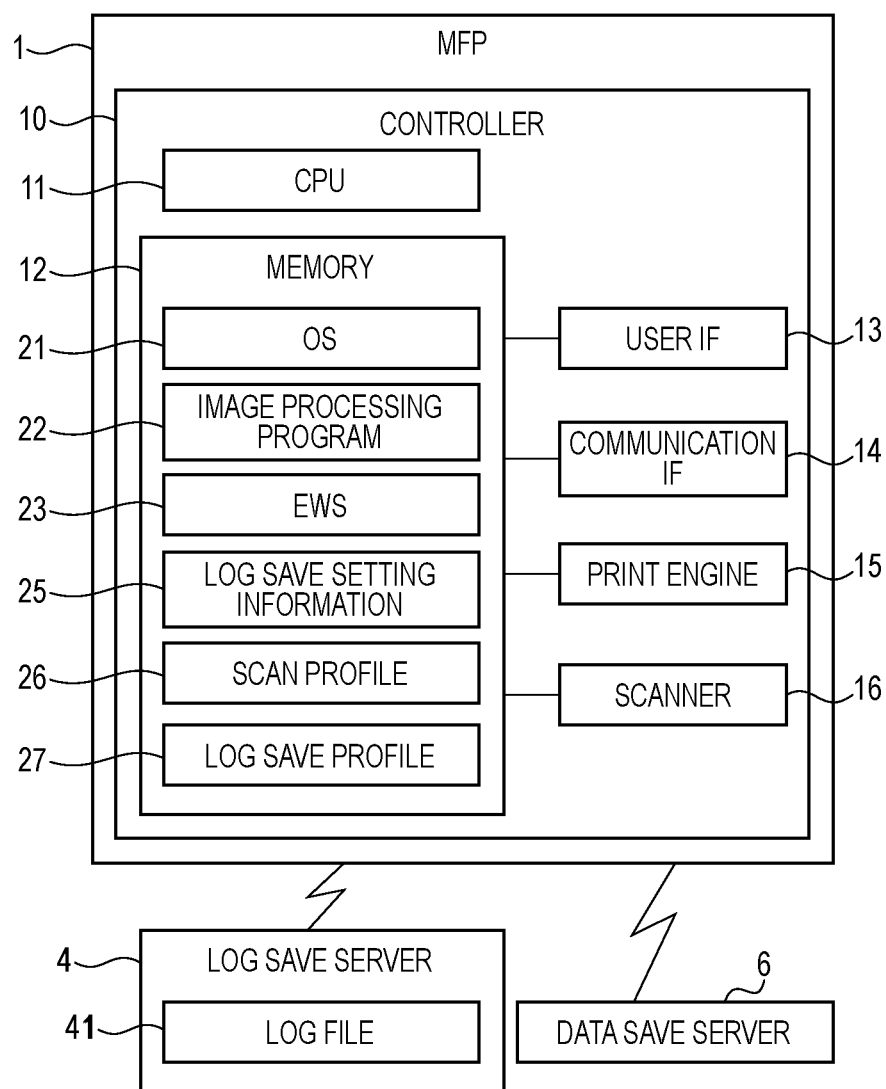
FIG. 1 is a block diagram showing a schematic configuration of an MFP.

As shown in FIG. 1, an MFP 1 of the present embodiment has a controller 10 including a CPU 11 and a memory 12. In addition, the MFP 1 has a user interface (hereinafter, referred to as 'user IF') 13, a communication interface (hereinafter, referred to as 'communication IF') 14, a print engine 15 and a scanner 16, which are electrically connected to the controller 10. The MFP 1 is an example of the image processing apparatus.

The CPU 11 is configured to execute a variety of processing, according to a program read out from the memory 12 and based on a user operation. Note that, the controller 10 in FIG. 1 is a general term, which collectively refers to hardware and software used for control of MFP 1, and does not represent single hardware that actually exists in the MFP 1.

In the memory 12 of the MFP 1 of the present embodiment, a variety of programs including an operating system (hereinafter, referred to as 'OS') 21 and an image processing program 22 and a variety of data are stored. The memory 12 is also used as a work area when a variety of processing is executed. A buffer included in the CPU 11 is also an example of the memory.

An example of the memory is not limited to a ROM, a RAM, an HDD, and the like built in the MFP 1, and may also be a storage medium that can be read and written by the CPU 11. For example, an external memory such as a USB memory and an HDD connected to the MFP 1 via the communication IF 14, and a memory and an HDD provided for an apparatus connected to the MFP 1 via the communication IF 14 are also examples of the memory.

Note that, a computer-readable storage medium is a non-transitory medium. The non-transitory medium also includes a storage medium such as a CD-ROM or a DVD-ROM, in addition to the above examples. The non-transitory medium is also a tangible medium. On the other hand, an electric signal that carries a program downloaded from a server or the like on the Internet is a computer-readable signal medium, which is a kind of the computer-readable medium, but is not included in the non-transitory computer-readable storage medium.

The user IF 13 includes hardware configured to display a screen for notifying a user of information and hardware configured to receive operations made by the user. The MFP 1 of the present embodiment may be provided with a touch panel having a screen display function and an operation receiving function, as the user IF 13, or may be a combination of a display screen and an operation button, or a combination of a touch panel and an operation button. The user IF 13 is an example of the input interface.

The communication IF 14 includes hardware for performing communication with an external apparatus such as a log save server 4 and a data save server 6. The communication standard of the communication IF 14 is Ethernet (registered trademark), Wi-Fi (registered trademark), USB or the like. The MFP 1 may include a plurality of communication IFs 14 corresponding to a plurality of communication standards.

The print engine 15 includes a configuration for printing an image on a print medium such as a sheet. An image forming method of the print engine 15 is, for example, an electrophotographic method or an inkjet method. The scanner 16 includes a configuration for reading an image of a document. The scanner 16 may be provided with an automatic document feeder.

The MFP 1 of the present embodiment includes an embedded web server (hereinafter, referred to as 'EWS') 23 including a program and data for functioning as a web server. By receiving an access to the EWS 23 from an apparatus including a web browser, such as a PC, the MFP 1 can exchange various information with the PC or the like via the EWS 23.

Subsequently, operations of the MFP 1 will be described. Note that, the following processing basically shows processing of the CPU 11 according to commands described in programs. That is, in the following descriptions, the processing such as "determination", "extraction", "selection", "calculation", "decision", "specifying", "acquisition", "receiving" and "control" represents the processing of the CPU 11. The processing by the CPU 11 also includes hardware control using an API of the OS. In the present specification, operations of each program are described, omitting the description of the OS. That is, in the following descriptions, the description to the effect that "program B controls hardware C" may refer to "program B controls hardware C with using the API of the OS". In addition, the processing of the CPU 11 according to the commands described in the program may be described in abbreviated wording. For example, the description such as 'CPU 11 performs' may be made. Further, the processing of the CPU 11 according to the commands described in the program may be described in wording of abbreviating the CPU, such as 'program A performs'.

Note that, 'acquisition' is used as a concept that does not necessarily require a request. That is, the processing of receiving data without the CPU 11 requesting is also included in the concept of 'the CPU acquires data'. In addition, the 'data' in the present specification is represented by a computer-readable bit string. Data having the same substantial meanings and different formats are treated as the same data. The same applies to the 'information' in the present specification. Further, 'requesting' and 'instructing' are concepts indicating that information indicating that a request is being made or information indicating that an instruction is being made is output to the other party. Further, the information indicating that the request is being made or the information indicating that the instruction is being made is simply described as 'request' or 'instruction'.

Further, the processing of determining whether the information A indicates the matter B by the CPU 11 may be conceptually described as 'determining from the information A whether it is the matter B'. The processing of determining whether the information A indicates the matter B or the matter C by the CPU 11 may be conceptually described as 'determining from the information A whether it is the matter B or the matter C'.

Figure 2:
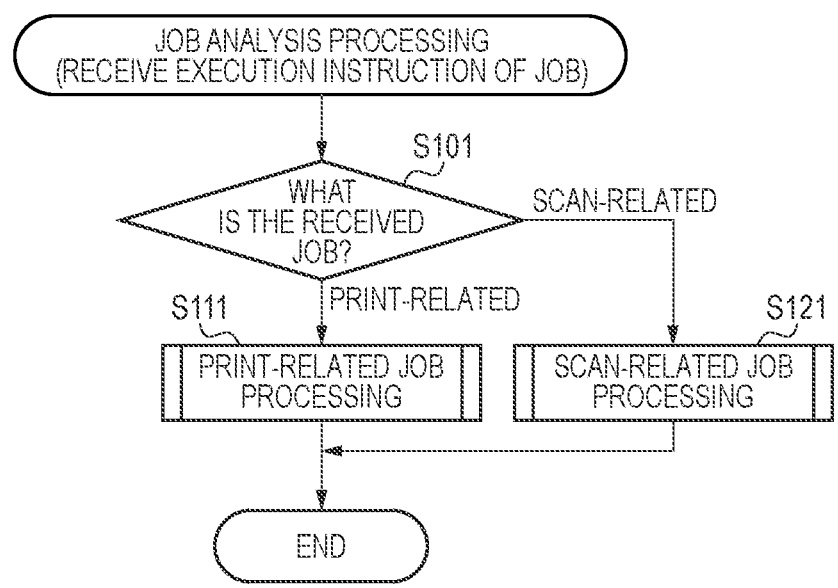
FIG. 2 is a flowchart showing a procedure of job analysis processing.

A procedure of job analysis processing by the image processing program 22 of the MFP 1 will be described with reference to a flowchart of FIG. 2. The job analysis processing is executed by the CPU 11 of the MFP 1 when an execution instruction of a job including image processing is received.

Note that, the MFP 1 can display a standby screen on the user IF 13 in a standby state, and can receive a variety of instruction inputs made by a user operation on the standby screen under display. In addition, the MFP1 can receive various commands transmitted from an external apparatus such as a PC connected to the MFP1, for example. The MFP 1 of the present embodiment executes the job analysis processing according to the image processing program 22 when an instruction input received via the user IF 13 or a command received from the external apparatus via the communication IF 14 is an execution instruction of a job including image processing in the MFP 1.

The CPU 11 determines whether the received execution instruction is an execution instruction of a print-related job or an execution instruction of a scan-related job (S101). The print-related job is an example of the print output job, and the scan-related job is an example of the file output job.

The print-related job is a job that generates print data from image data indicating an image of a print target by image processing and executes a print output based on the generated print data by the print engine 15. The MFP 1 receives an execution instruction of a print-related job by receiving, for example, image data and a printing command to instruct printing of the image data via the communication IF 14. Further, the MFP 1 can also receive the execution instruction of the print-related job by an instruction input via the user IF 13.

Note that, the image data of a print target in the execution instruction of the print-related job via the user IF 13 includes, for example, image data stored in the memory 12, image data downloaded via the communication IF 14, image data stored in the USB memory mounted on the MFP 1 and image data acquired by scanning a document set on the scanner 16. That is, the execution instructions such as FAX printing, storage printing, download printing, USB direct printing, and copying are all execution instructions of the print-related job.

The scan-related job is a job that executes image processing of reading a plurality of pages of a document with using the scanner 16 to generate image data based on images of the document and further outputs an image file including the generated image data. The MFP 1 receives an execution instruction of a scan-related job via the user IF 13 in a state where a document is placed on the scanner 16, for example. In the execution instruction of the scan-related job, the MFP 1 receives a designation of an output destination of the generated image file. Note that, a copy execution instruction may be treated as the execution instruction of the scan-related job.

When it is determined that the received instruction is an execution instruction of a print-related job (S101: print-related), the CPU 11 executes print-related job processing (S111). On the other hand, when it is determined that the received instruction is an execution instruction of a scan-related job (S101: scan-related), the CPU 11 executes scan-related job processing (S121).

A procedure of the print-related job processing will be described with reference to a flowchart of FIG. 3. In the print-related job processing, the CPU 11 first determines whether or not a setting to save a log of a print-related job is made (S201). Various settings relating to log save are registered in advance in the MFP 1 before receiving an execution instruction of a job.

The MFP1 can receive an instruction of various settings relating to log save via the EWS 23, for example. When the MFP 1 receives an access to the EWS 23, the MFP 1 transmits web page data including various setting pages. An administrator who manages the MFP 1 can access the EWS 23 of the MFP 1 with using, for example, a management PC or the like, and cause a web page relating to the log save to be displayed on a display of the management PC or the like, thereby transmitting a setting instruction relating to the log save to the MFP 1.

Figure 4:
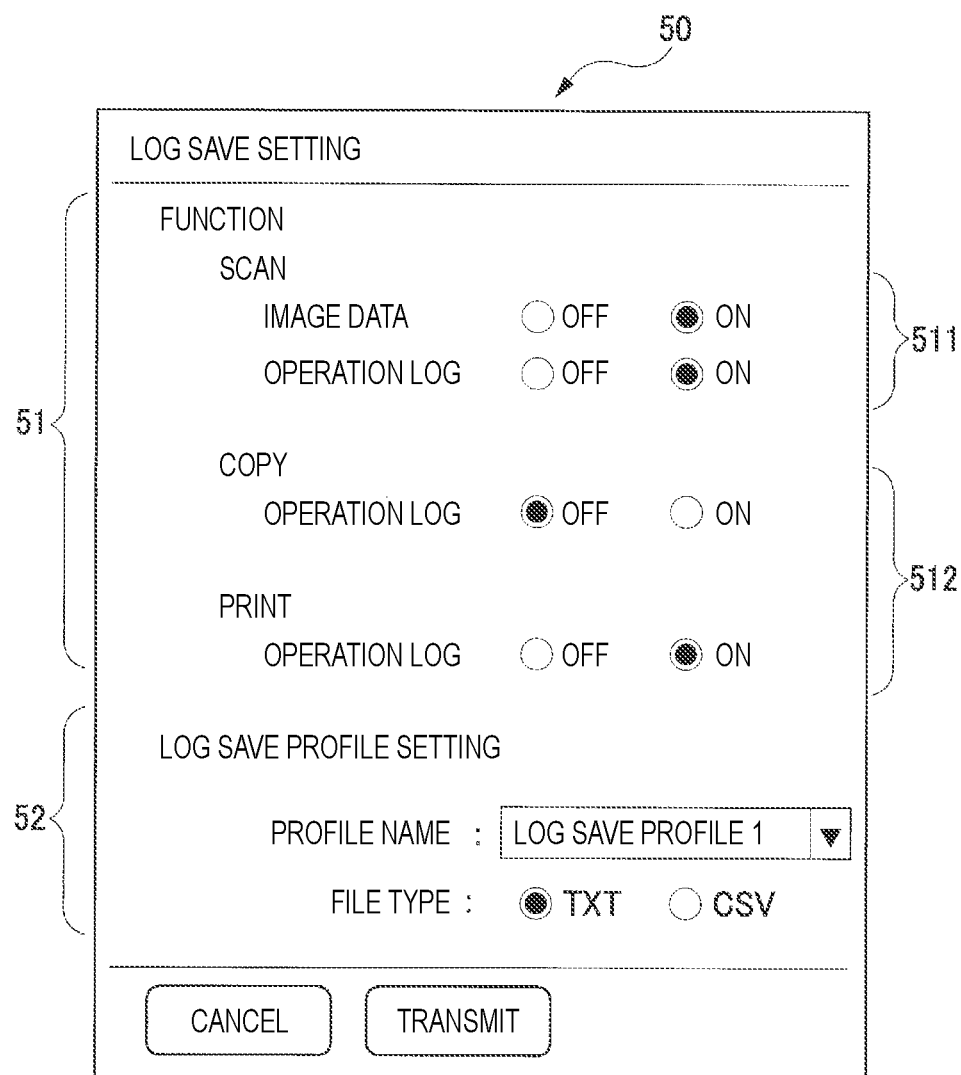
FIG. 4 illustrates an example of a log save setting receiving screen.

The web page data of the EWS 23 includes, for example, as shown in FIG. 4, data indicating a log save setting receiving screen 50. The log save setting receiving screen 50 is a screen that receives selection of a log setting 51 and a log save profile setting 52, as the log save setting.

The MFP 1 receives a setting as to whether or not to save a log for each function in the log setting 51. The log setting 51 of the log save setting receiving screen 50 shown in FIG. 4 includes, for example, radio buttons 511 for receiving settings as to whether or not to save operation log data and image log data in the scan function, and radio buttons 512 for receiving settings as to whether or not to save operation log data in the copy function and the print function. The MFP 1 stores information on various settings received via the log save setting receiving screen 50 in the memory 12, as log save setting information 25, for example, as shown in FIG. 1.

The operation log data is log data relating to an executed operation, and is written to a log file by, for example, text data. The image log data is log data based on image data generated by reading in the scan-related job, and is saved as, for example, an image log file.

The MFP 1 of the present embodiment saves, as the operation log data, information on each item of, for example, a job function, an execution date, an execution time, a file name of a job execution target, a user name having made an execution instruction of a job, output destination information, and the number of pages. The file name is information indicating a file name of a print target in the print-related job other than the copy function or a file name of an output target in the scan-related job. The output destination information is information that is stored in a case of the scan-related job and indicates an output destination of a file. Note that, the items included in the operation log data are not limited to the above, and may also include, for example, information on print parameters and scan parameters received with the execution instruction of a job.

The MFP 1 receives a setting to the log save profile setting 52 on the log setting 51 of the log save setting receiving screen 50. The MFP 1 receives selection of a log save profile name and selection of a file format of a log file for saving the operation log data, as the log save profile setting 52. In the log save profile setting 52 of the log save setting receiving screen 50, the MFP 1 receives selection of a registered log save profile 27 (refer to FIG. 1). The various information received with the log save profile setting 52 is a parameter that is commonly used for log save, regardless of a type of a function that is a log save target, and is an example of the common parameter.

Figure 5:
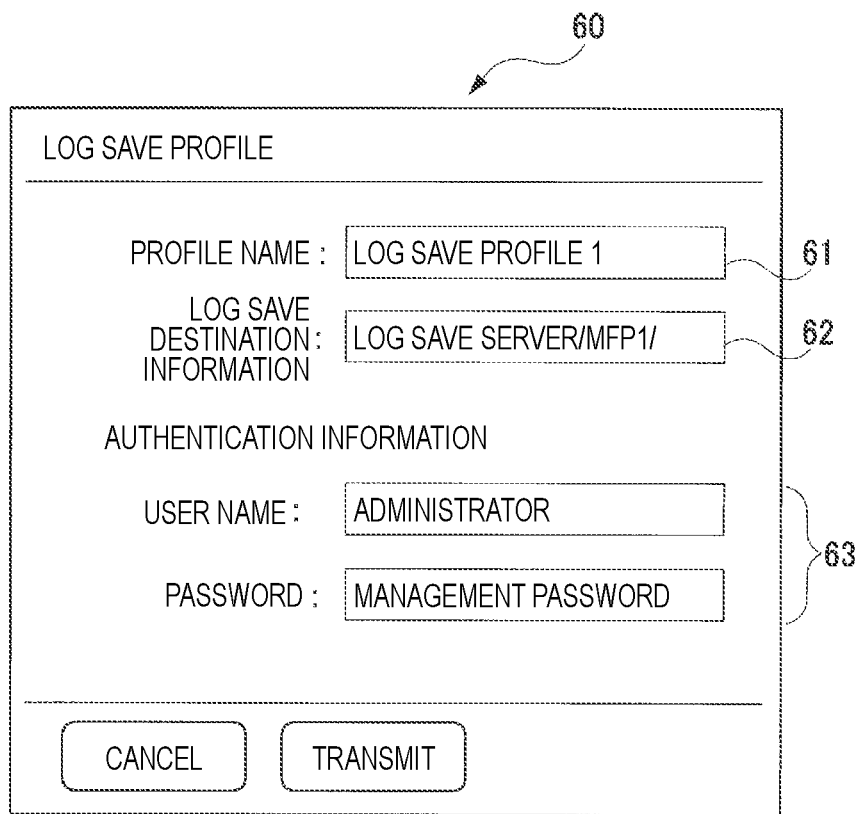
FIG. 5 illustrates an example of a log save profile receiving screen.

The MFP 1 can receive registration of the log save profile via, for example, the EWS 23. The web page data of the EWS 23 includes, for example, as shown in FIG. 5, web page data of a log save profile receiving screen 60 for receiving a setting of the log save profile. The administrator who manages the MFP 1 can cause the log save profile receiving screen 60 to be displayed on the display of the management PC or the like and instruct the MFP 1 to register the log save profile. The MFP 1 stores the log save profile 27 in the memory 12, based on the information received via the log save profile receiving screen 60. The log save profile receiving screen 60 is an example of the setting screen.

As shown in FIG. 5, for example, the log save profile receiving screen 60 is a screen for receiving designation of a name 61 of a log save profile to be registered, save destination information 62, and authentication information 63. The name 61 is information that is displayed as an option in the log save profile setting 52 of the log save setting receiving screen 50 described above. The save destination information 62 is information indicating a save destination in which the operation log data and the image log data are to be saved. The authentication information 63 is information necessary for accessing a save destination of a log designated by the save destination information 62. That is, the log save profile 27 is information including the name 61, the save destination information 62, and the authentication information 63.

In the example of FIG. 5, a log save server 4 is designated as the save destination in the save destination information 62. In this case, the log save server 4 is an example of the server, and the save destination information 62 is information on the server and is an example of the access information. The save destination information 62 corresponds to, for example, a file name of a log file including the operation log data, a path of a folder of a log file, and an IP address of the log save server 4. The authentication information 63 corresponds to, for example, a set of a user name and a password of a user who is permitted to access the log save server 4, and an access token. Note that, when the authentication information is not required to access the save destination, the MFP 1 may not receive the authentication information 63.

Since the various parameters relating to the log save are received by the log save profile receiving screen 60, the administrator can easily make a setting relating to the log save. Since the various parameters set by the log save profile receiving screen 60 can be collectively selected in the log save profile setting 52 of the log save setting receiving screen 50, regardless of the function, the administrator can easily manage the setting of the log save.

Further, an administrator who manages a plurality of devices can make a setting of, for example, saving a log file of each device in one log save server 4, which enables easy management. For example, by providing a folder or log file for each device of a management target in the log save server 4 and designating the folder or log file as the save destination information 62 on the log save profile receiving screen 60 of each device, the administrator can easily confirm a log for each device. When information that can identify each device, such as a name including a serial number, is written as a folder name or a log file name, a relationship between the log file and the device can be easily understood.

Figure 3:
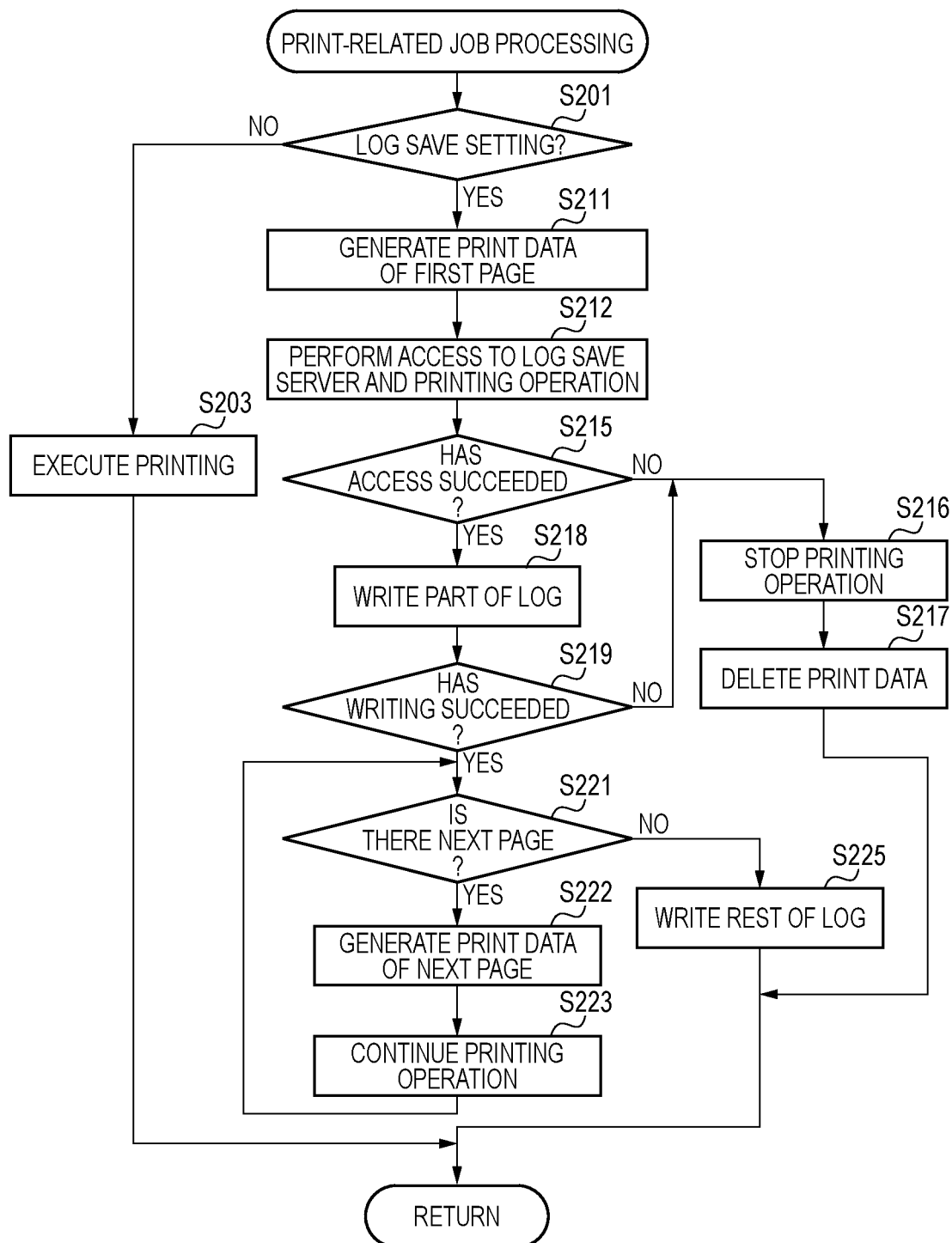
FIG. 3 is a flowchart showing a procedure of print-related job processing.

Returning to the description of the print-related job processing of FIG. 3, when it is determined that a setting to save a log is not made (S201: NO), the CPU 11 executes a normal printing operation (S203) and does not generate or save the log. For example, when the log setting 51 shown in FIG. 4 is received, the MFP 1 saves the log if the received job is a job of a print function, and does not save the log if the job is a job of a copy function. After step S203 is performed, the CPU 11 ends the print-related job processing, returns to the job analysis processing, and ends the job analysis processing.

Figure 6:
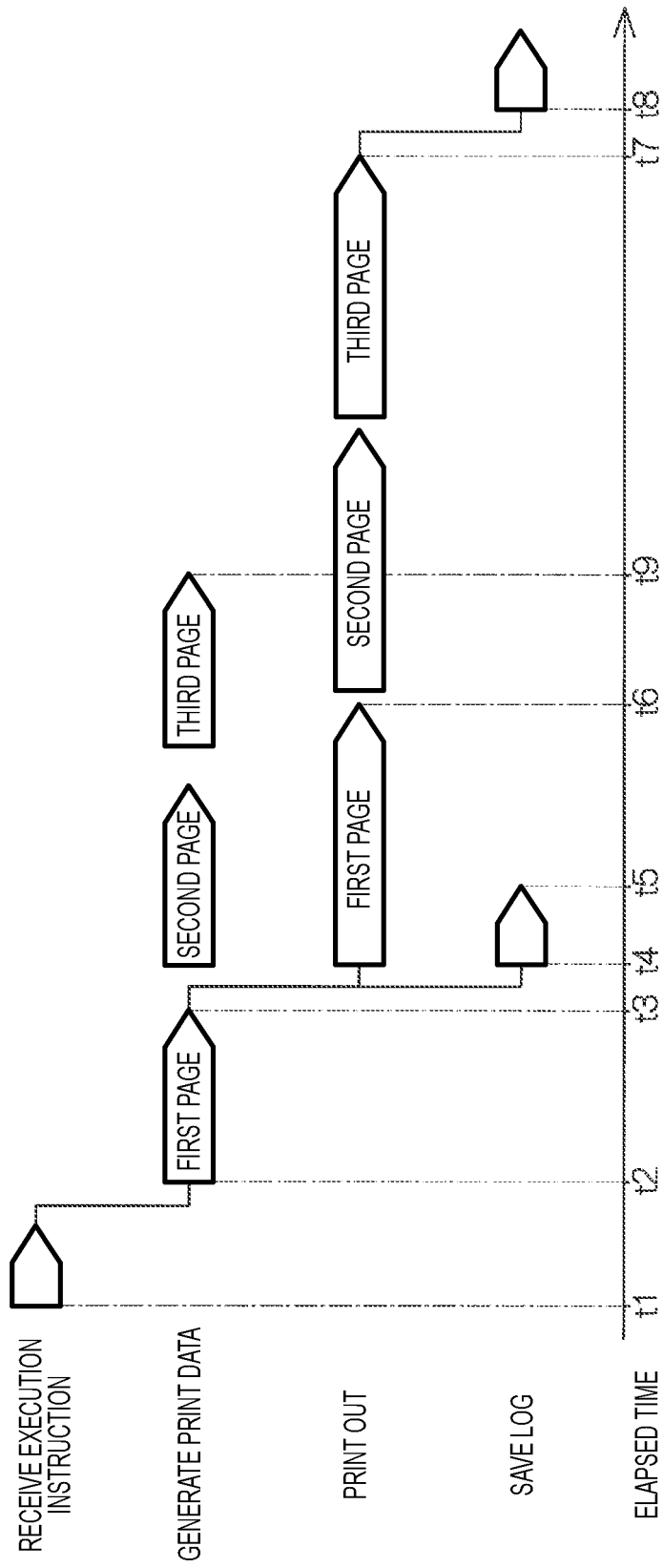
FIG. 6 illustrates timing of each operation during execution of a print-related job.

On the other hand, when it is determined that a setting to save a log is made (S201: YES), the CPU 11 starts to generate print data of a first page (S211, t2 in FIG. 6). FIG. 6 is a diagram schematically showing a processing order and elapsed time from a timing (t1) at which the execution instruction is received, for the print-related job including images of three pages.

When a function to be executed is a print function, the CPU 11 executes rasterization, based on PDL data of a print target, for example, thereby generating print data for print. In addition, when a function to be executed is a copy function, the CPU 11 operates the scanner 16 and generates print data for print, based on a scan result. The print data is an example of the image data indicating a raster image for print.

After generating the print data of the first page (t3 in FIG. 6), the CPU 11 accesses the log save server 4 set as the log save destination and starts a printing operation (S212, t4 in FIG. 6). The CPU 11 tries to access a log file 41 (refer to FIG. 1) designated as the save destination in the log save profile setting 52, via the communication IF 14. In addition, the CPU 11 starts the printing operation by transferring the print data to the print engine 15.

Then, the CPU 11 determines whether the access to the log save server 4 has succeeded or not (S215). For example, when communication with the log save server 4 has succeeded, the CPU 11 may determine that the access has succeeded. In addition, for example, when data for requesting access is transmitted to the log save server 4 and a reply is received from the log save server 4 within a predetermined time, the CPU 11 may determine that the access has succeeded.

On the other hand, for example, when communication with the log save server 4 has failed, the CPU 11 may determine that the access has failed. In addition, for example, when data for requesting access is transmitted to the log save server 4 and a reply is not received from the log save server 4 within a predetermined time, the CPU 11 may determine that the access has failed. Further, for example, when a name resolution or an address resolution of the log save server 4 has failed, the CPU 11 may determine that the access has failed.

When it is determined that the access has not succeeded (S215: NO), the CPU 11 interrupts the printing operation started in step S212 (S216) and deletes the print data generated in S211 (S217). Note that, when the CPU 11 has started to generate print data of a next page, the CPU also interrupts the processing. Further, the CPU 11 may delete the received image data or the like.

When it is determined that the access to the log save server 4 has succeeded (S215: YES), the CPU 11 writes a part of the operation log data relating to the print-related job executed this time to the designated log file 41 (S218). The part of the operation log data is information that is perceived at this point among the respective items of the operation log data, for example, information on items other than the number of printed pages, such as a function, an execution date, an execution time, a file name and a user name.

Then, the CPU 11 determines whether the writing of the operation log data has succeeded or not (S219). For example, when there is a reply indicating that the writing has succeeded after transmitting the writing instruction to the log file 41, the CPU 11 determines that the writing has succeeded.

Note that, when there is no log file 41 with a designated file name in the folder designated as the save destination of the log file, the CPU 11 may newly create and write the log file 41, or may cause an error. Specifically, for example, when a writing instruction to the log file 41 is transmitted to the log save server 4 and there is a reply of an error indicating that there is no log file 41, the CPU 11 may transmit an instruction to newly create the log file 41 and again transmit the writing instruction to the created log file 41. On the other hand, when the writing instruction to the log file 41 is transmitted to the log save server 4 and there is a reply of an error indicating that there is no log file 41, the CPU 11 may determine that the writing has failed. In addition, for example, a specification is also possible in which when the log save server 4 receives the writing instruction to the log file 41 in a state where there is no log file 41, the log save server newly creates the log file 41, writes the log data thereto and makes a reply indicating that the writing has succeeded.

On the other hand, for example, when the transmission of the writing instruction to the log file 41 to the log save server 4 has failed, the CPU 11 may determine that the writing has failed. In addition, for example, where there is a reply indicating an error after transmitting the writing instruction to the log file 41, the CPU 11 may determine that the writing has failed. Further, for example, when there is no reply within a predetermined time after transmitting the writing instruction to the log file 41, the CPU 11 may determine that the writing has failed. Further, for example, as in step S215, when communication with the log save server 4 has failed, the CPU 11 may determine that the writing has failed. When it is determined that the writing of the operation log data has not succeeded (S219: NO), the CPU 11 proceeds to step S216, interrupts the printing operation, and deletes the print data.

After receiving the instruction to start the printing operation, the print engine 15 warms up each unit, conveys a sheet, and the like. Therefore, for example, as shown in FIG. 6, a time (t4 to t5) required for the trial of access to the log save server 4 and the writing of the operation log data is often shorter than a time (t4 to t6) from the start of the printing operation to completion of printing on a first sheet. Therefore, by interrupting the operation at a time point when NO is determined in step S215 or step S219 after starting the operation in parallel in step S212, it is possible to reduce a possibility that the printing of the first page will be completed without saving the log.

On the other hand, the MFP 1 of the present embodiment generates the print data of the first page (t2 to t3 in FIG. 6) before the trial of access to the log save server 4 and the writing of the operation log data (t4 in FIG. 6). Therefore, it is unlikely that the processing for saving the log will delay the start of printing.

The MFP 1 of the present embodiment saves a part of the operation log data before the generation of the print data of all pages is completed. Therefore, even when the job is stopped before the printing is completed, due to cancellation of the job by the user operation, an error or the like, a trace of the job remains on the log save server 4. Therefore, the administrator of the MFP 1 can also perceive the job stopped in the middle.

When it is determined that the writing of the operation log data has succeeded (S219: YES), the CPU 11 continues the printing operation. Specifically, the CPU 11 determines whether or not there is a next page in the image of the print target of the job instructed to be executed (S221). When it is determined that there is a next page (S221: YES), the CPU 11 generates print data of the next page (S222) and continuously performs the printing operation (S223).

When it is determined that there is no next page (S221: NO), i.e., when it is determined that the generation of print data for all pages of the job instructed to be executed has been completed, the CPU 11 additionally writes the remaining operation log data to the log file 41 to which the information on the part has been written in step S218 (S225). The remaining operation log data is, for example, information on the number of printed pages.

In the example shown in FIG. 6, the CPU 11 writes the remaining operation log data to the log file 41 (t8) after completing printing of a third page (t7). Note that, the timing of writing the remaining operation log data is not limited to a timing after the printing of the final page has been completed, and may be, for example, a timing after a timing (t9) at which the generation of print data of a final page has been completed. In addition, after step S225, the CPU 11 may close the log file 41 to which the operation log data has been written and disconnect the connection to the log save server 4.

After step S217 or step S225, the CPU 11 ends the print-related job processing, returns to the job analysis processing, and ends the job analysis processing. The MFP 1 displays, for example, the standby screen and enters a standby state.

Next, a procedure of scan-related job processing, which is processing that is executed when it is determined that the received instruction is an execution instruction of a scan-related job, will be described with reference to a flowchart of FIG. 7. In the scan-related job processing, the CPU 11 determines whether or not a setting to save a log of a scan-related job is made (S301).

As in the case of the print-related job, the CPU 11 determines whether or not a setting to save a log of a scan-related job is made, based on the log save setting information 25 stored in the memory 12. In the scan-related job, since the setting to save each of the operation log data and the image log data can be received, the CPU 11 determines that, when a setting to save at least one of them is made, the setting is a setting to save a log.

When it is determined that a setting to save a log is made (S301: YES), the CPU 11 tries to access the save destination of the log before operating the scanner 16. Specifically, similarly to the print-related job, the CPU 11 reads out the log save profile 27 selected in the log save profile setting 52 shown in FIG. 4 and acquires the save destination information 62 included in the log save profile 27. The CPU 11 tries to access the log save server 4 designated as a save destination in the save destination information 62 (S302).

Then, the CPU 11 determines whether the access has succeeded or not (S303). S303 is the similar processing to step S215 of the print-related job processing. When a setting is made in which both the operation log data and the image log data are to be saved and the save destinations are different between the operation log data and the image log data, the CPU 11 tries to access both the save destinations, and determines in S303 that the access has succeeded when the access to both the save destinations has succeeded.

When it is determined that the access to the log save server 4 has not succeeded (S303: NO), the CPU 11 ends the scan-related job processing without operating the scanner 16, returns to the job analysis processing, and ends the job analysis processing. When the log save server 4 could not be accessed, the MFP 1 cannot save the log. When the access to the log save server 4 has failed, the MFP 1 does not start the scanning operation, so that a useless operation can be avoided.

When it is determined that the access to the log save server 4 has succeeded (S303: YES), the CPU 11 tries to access the output destination of the image file, based on the scan profile selected by the user (S305). For example, when the data save server 6 is designated as the output destination of the image file, the CPU 11 tries to access the data save server 6 and determines whether the access has succeeded or not (S306).

Figure 8:
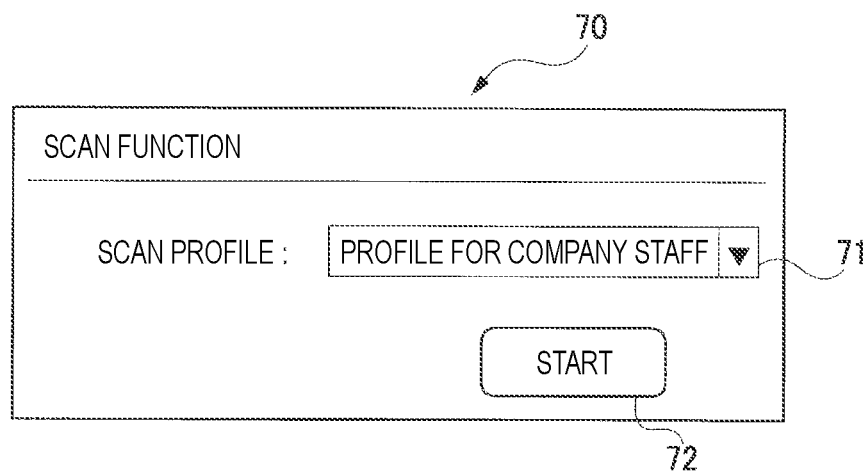
FIG. 8 illustrates an example of a scan function selecting screen.

When the scan function is selected on the standby screen, the MFP 1 displays a scan function selection screen 70 on the user IF 13, for example, as shown in FIG. 8, and receives designation of a scan profile regarding the scan-related job to be executed. The scan function selection screen 70 is a screen including, for example, a scan profile selection field 71 and a start button 72, and configured to receive selection by a user who issues an instruction to execute a job. The scan function selection screen 70 is an example of the selection screen. When the start button 72 of the scan function selection screen 70 is operated in step S305, the CPU 11 acquires information on the output destination of the image file, based on a scan profile selected in the scan profile selection field 71.

The MFP 1 stores a registered scan profile 26 in the memory 12, for example, as shown in FIG. 1. The MFP 1 can register a plurality of scan profiles 26, and the scan profile selection field 71 of the scan function selection screen 70 is a field for receiving selection of one of the scan profiles 26 registered in the MFP 1. The scan profile 26 includes information for designating an output destination of an image file that is a reading result, and information for creating an image file. The scan file 26 is an example of the job profile.

Figure 9:
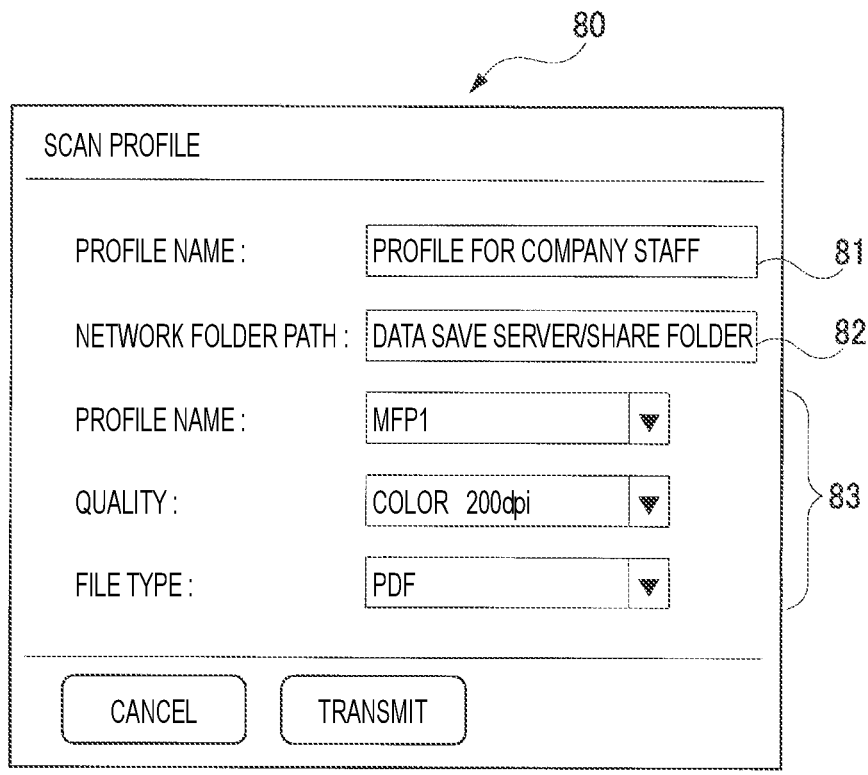
FIG. 9 illustrates an example of a scan profile receiving screen.

The MFP 1 receives an instruction to register the scan profile 26, for example, via the EWS 23. The web page data of the EWS 23 includes, for example, as shown in FIG. 9, web page data of the scan profile receiving screen 80 for receiving a setting of a scan profile and an instruction for registration. The administrator who manages the MFP 1 can cause the scan profile receiving screen 80 to be displayed on the management PC or the like and instruct the MFP 1 to register the scan profile. The MFP 1 stores the scan profile 26 in the memory 12, based on the information received via the scan profile receiving screen 80.

As shown in FIG. 9, for example, the scan profile receiving screen 80 is a screen for receiving designation of a name 81 of a scan profile to be registered, output destination information 82, and a parameter 83. The name 81 is information that is displayed as an option in the scan profile selection field 71 of the scan function selection screen 70 described above.

The output destination information 82 is information indicating an output destination to which an image file of a reading result is to be output. As the output destination of the image file, for example, the data save server 6 connected to the MFP 1 or a USB memory mounted on the MFP 1 can be selected. In the example of FIG. 9, the data save server 6 is designated as the output destination. In this case, the data save server 6 is an example of the storage. The output destination information 82 is an example of the storage information and an example of the output destination parameter.

The parameter 83 is a plurality of information that are referred to by the MFP 1 in the processing from the execution of the scan to the generation of the image file. The parameter 83 includes at least one piece of information of a parameter relating to reading such as scan quality, a parameter relating to generation of image data such as a trimming range, and a parameter relating to file generation such as a file name and a file type of an image file to be generated. The parameter 83 is an example of the file generation parameter.

When the scan profile 26 in which the output destination information 82 and the parameter 83 are associated with each other is registered in advance in the MFP 1 by the administrator, the user who instructs the execution of the job may select the registered scan profile 26. That is, since the user who uses the MFP 1 has only to select the registered scan profile 26 in the scan profile selection field 71 of the scan function selection screen 70 shown in FIG. 8 and to operate the start button 72, the user can simply perform the designation without knowing the detailed information, which reduces time and effort. In addition, it is possible to prevent the user from designating an inappropriate output destination or parameter, and the administrator can appropriately manage the output destination or parameter of the file. Note that, the scan profile 26 can be registered and edited only when the user has an administrator authority or by a dedicated program installed in the administrator PC or the like, and may be configured so as not to be used by general users.

Figure 7:
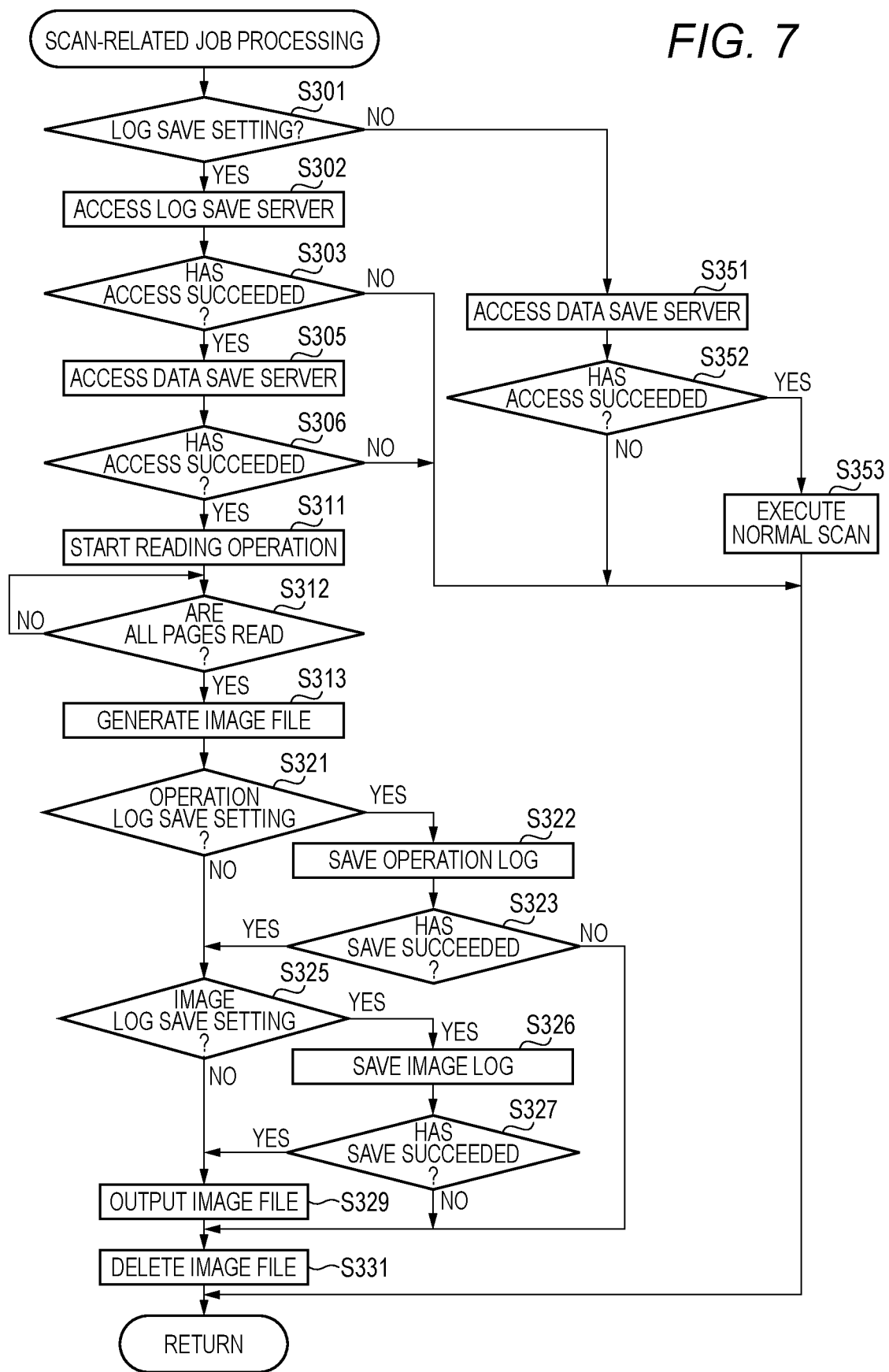
FIG. 7 is a flowchart showing a procedure of scan-related job processing.

Returning to the description of the scan-related job processing of FIG. 7, when it is determined that the access to the data save server 6 has not succeeded (S306: NO), the CPU 11 ends the scan-related job processing without operating the scanner 16, returns to the job analysis processing, and ends the job analysis processing. When the data save server 6 could not be accessed, the MFP 1 cannot output an image file even when the image file is generated. When the access to the data save server 6 has failed, the MFP 1 does not start the scanning operation, so that a useless operation can be avoided.

Figure 10:
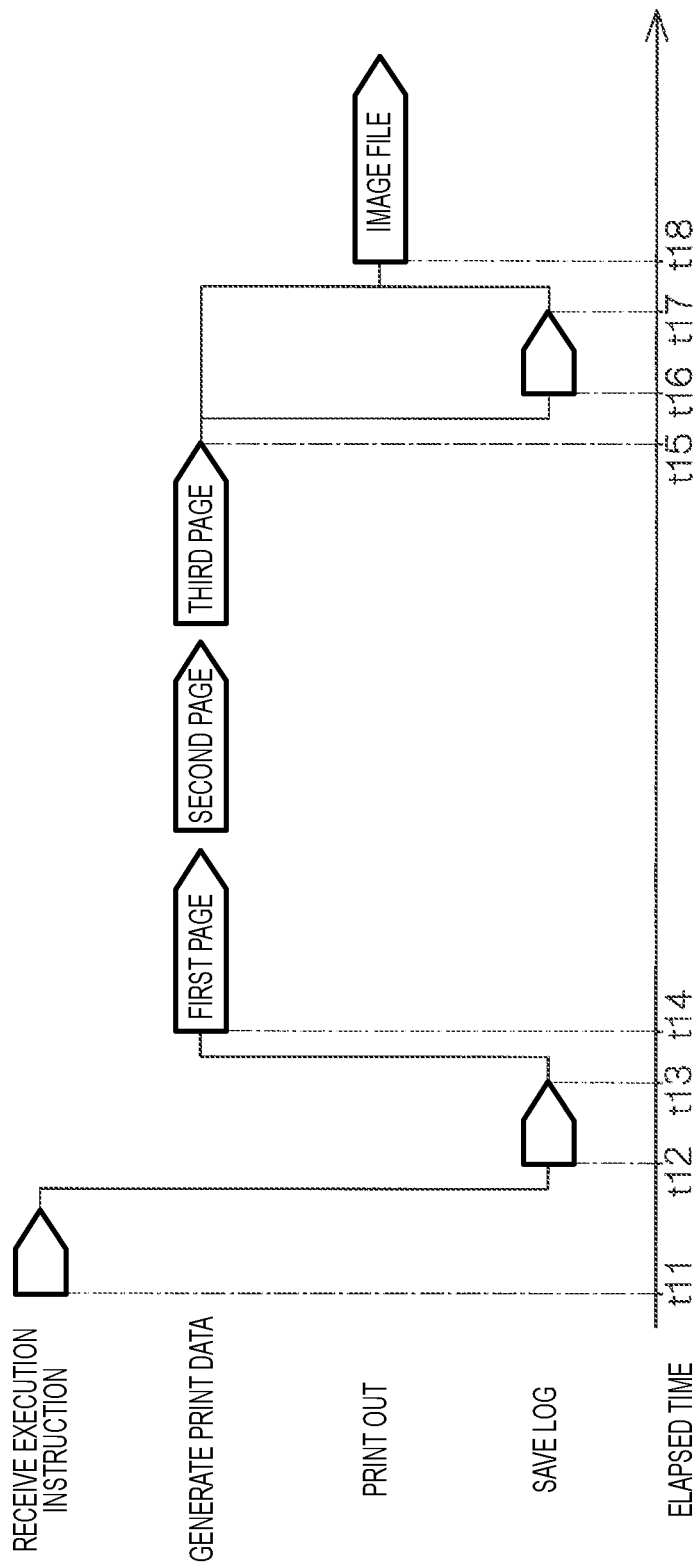
FIG. 10 illustrates timing of each operation during execution of a scan-related job.

When it is determined that any of the access to the log save server 5 and the access to the data save server 6 has succeeded (S306: YES), the CPU 11 operates the scanner 16 to start reading of a document and generation of image data (S311). In step S311, the CPU 11 causes the scanner 16 to perform a scan with using the parameters designated in the selected scan profile 26. That is, after the CPU 11 has succeeded in accessing the log save server 5 (t12 to t13 in FIG. 10), the CPU 11 starts generation of image data (t14 in FIG. 10). FIG. 10 is a diagram schematically showing a processing order and elapsed time from a timing (t11) at which the execution instruction is received, for the scan-related job of reading three pages of a document.

The CPU 11 sequentially reads the document from a first page, and generates image data, based on a reading result. For example, when the document is inserted into the automatic document feeder, the scanner 16 collectively reads the plurality of pages of the inserted document in order from the first page, and when the document is not inserted into the automatic document feeder, the scanner 16 reads the document placed on a flatbed one by one. Then, the CPU 11 determines whether the reading of all pages of the document has been completed or not (S312). When it is determined that there is a document that has not been read yet (S312: NO), the CPU 11 continues the reading operation until the reading of all pages is completed.

When it is determined that the reading of all pages has been completed (S312: YES, t15 in FIG. 10), the CPU 11 generates an image file by writing image data of all pages generated by the reading to the image file (S313). The CPU 11 generates an image file with using the parameters designated in the scan profile 26 selected by an execution instruction of scan, and temporarily stores the image file in the memory 12.

After generating the image file, the CPU 11 saves the log that has been determined as being set as save in step S301 (t16 to t17 in FIG. 10). The CPU 11 determines whether a setting to save operation log data is made or not (S321). When it is determined that a setting to save the operation log data is made (S321: YES), the CPU 11 opens the log file 41, which is the save destination of the operation log data, and saves the operation log data by writing the information about the scan-related job executed this time (S322). The operation log data in the scan-related job is an example of the parameter that is used for reading. Then, the CPU 11 determines whether the save of the operation log data has succeeded or not (S323).

When it is determined that a setting to save the operation log data is not made (S321: NO), or when it is determined that the save of the operation log data has succeeded (S323: YES), the CPU 11 determines whether a setting to save the image log data is made or not (S325).

When it is determined that a setting to save the image log data is made (S325: YES), the CPU 11 generates an image log file for saving the image log data, in a folder designated as a save destination of the image log data, and writes the image log data based on the image data acquired by the reading (S326). Note that, the MFP 1 stores in advance a generation rule for generating an image log file name for saving image log data, and generates an image log file with the file name in a folder designated as a save destination. Then, the CPU 11 determines whether the save of the image log file has succeeded or not (S327). S323 and S327 are the similar processing to step S219 of the print-related job processing.

The image log file may be the image file itself generated in S313, which is a transmission target, may be a file including the image data generated by the reading, or may be a file including data as a result of performing image processing such as reduction or monochromating on the image data. In addition, the image log file in a case where the image data of a plurality of pages is generated by scanning a plurality of pages may be one file in which image data of all the pages is integrated, may be a plurality of files such as for each page, or may be a file based on image data of some pages. By including and saving the data based on the read image data in the log, the administrator can check what kind of image was scanned, for example, whether a highly confidential document was scanned.

When it is determined that a setting to save the image log data is not made (S325: NO), or when it is determined that the save of the image log data has succeeded (S327: YES), the CPU 11 outputs the image file generated in S313 to the output destination designated in the scan profile 26 selected by the execution instruction of scan (S329, t18 in FIG. 10).

After step S329 is performed, or when it is determined that the save of the operation log data has not succeeded (S323: NO), or when it is determined that the save of the image log data has not succeeded (S327: NO), the CPU 11 deletes the image file generated in step S313 from the memory 12 (S331). When the save of the log has not succeeded, the CPU 11 does not output the image file.

In a case of a scan-related job, the image data of all pages is integrated and output as an image file. Therefore, if the job is interrupted in the middle, even when there is read image data, no image data of any page is output. In the case of the scan-related job, there is little need to leave a trace of the job in the middle of the job. Since the MFP 1 of the present embodiment outputs the image file when the save of the log has actually succeeded, it is possible to avoid outputting the image file without saving the log relating to the scan-related job.

On the other hand, when it is determined that a setting to save the log relating to the scan is not made (S301: NO), the CPU 11 tries to access the data save server 6 designated as the output destination of the image file in the selected scan profile 26 (S351). Then, the CPU 11 determines whether the access has succeeded or not (S352).

When it is determined that the MFP 1 could access the data save server 6 (S352: YES), the CPU 11 executes a normal scan (S353). Specifically, the CPU 11 operates the scanner 16 to read a document, based on the scan profile 26, and generates image data, based on a reading result. In addition, when the reading of all the pages has been completed, the CPU 11 generates an image file including the image data and transmits the image file to the data save server 6.

After S353, or when it is determined that the MFP 1 could not access the data save server 6 (S352: NO), the CPU 11 ends the scan-related job processing, returns to the job analysis processing, and ends the job analysis processing. Note that, when the data save server 6 could not be accessed, the CPU 11 may display an error message on the user IF 13.

As described in detail above, the MFP 1 of the present embodiment performs access confirmation to the log save server 4 before outputting an image file, at the time of receiving the execution instruction of the scan-related job, stops the scan-related job when the log save server 4 could not be accessed, and also stops the scan-related job even when the log could not be saved in the log save server 4. This makes it possible to reduce a situation where even though a scan-related job has been executed, a log relating to the executed scan-related job is not saved in the log save server 4.

In addition, the MFP 1 of the present embodiment tries to access the log save server 4 before starting reading of a document, and does not start the reading when the log save server could not be accessed. Therefore, it is possible to avoid a useless scan operation.

Further, the MFP 1 of the present embodiment stores the common access information in advance in the memory 12 when it comes to the save of a log. Therefore, by using the access information at the time of confirming the access to the log save server 4 and at the time of saving the log, the log is securely saved in a desired server.

Further, the MFP 1 of the present embodiment receives the setting of various parameters relating to the save of the log via the EWS 23, and stores the received parameters in the memory 12. Therefore, the administrator can set the various parameters with using the management PC or the like, which enables the easy management. Further, the MFP 1 can register the parameters relating to the output of the file in the scan-related job, separately from the parameters relating to the save of the log. Therefore, the user who uses the MFP 1 can easily select the parameters at the time of executing the scan-related job.

Note that, the present embodiment is just exemplary and does not limit the present invention. Therefore, the technology disclosed herein can be diversely improved and modified without departing from the gist thereof. For example, the log save server and the data save server are not limited to one, and a plurality of servers may be used differently. In addition, for example, the image processing apparatus may have at least a scan function and a communication function, is not limited to the MFP and may also be a scanner, a copier or a FAX apparatus.

In addition, the screens shown in the respective drawings are examples, and the display forms are not limited to the shown examples. For example, the wording of the message, the shape of the button and the like displayed on each screen are not limited to the shown examples. Further, assuming that the MFP 1 is provided with the EWS 23, the examples of the various setting screens that are displayed on the display of a PC or the like via the EWS 23 have been described with reference to FIGS. 4, 5, 8, and 9. However, the MFP 1 may not have the EWS 23. For example, the MFP 1 may be able to display various setting screens on the user IF 13, and to receive various settings made by the administrator who manages the MFP 1, via the user IF 13. Further, the MFP 1 may be able to receive various settings made by the administrator who manages the MFP 1 by commands transmitted from an application incorporated in the PC or the like.

In addition, the configuration of the folder that is a save destination of a log is not limited to each device that is a management target. For example, a configuration may be possible in which logs of a plurality of devices are written to one folder. In this case, the MFP 1 may write a log to a log file different for each device, may write logs of a plurality of devices to one log file, or may write a log to one log file each time a job is executed, regardless of the device.

Further, in the present embodiment, the example where the operation log data is additionally written to the log file 41 prepared in the log save server 4 in steps S218 and S225 of the print-related job processing and in steps S323 and S327 of the scan-related job processing has been described. However, for example, the MFP 1 may be configured to generate a log file including the operation log data for each job and to transmit the log file to a predetermined folder.

Further, in the present embodiment, the example where the image data of all pages is output as one image file, as the scan-related job, has been described. However, a plurality of files in each of which the image data is written for each page may be output. Further, in the present embodiment, the various settings such as an output destination of a file in the scan-related job are selected from the registered scan profiles in the scan profile selection field 71 of the scan function selection screen 70 shown in FIG. 8 but may be able to be received at the time of instructing the scan execution.

Further, the timing of confirming the access to the log save server 4 in the print-related job is not limited to the time when the generation of the print data of the first page is completed, and may be any time after the generation of the image data of the first page is started and before the image data of the first page is output. For example, the access may be confirmed at a timing of knowing the print-related job during the analysis of the received data or at a timing of starting rasterization.

Further, in the present embodiment, the operation log data of the print-related job is saved in two steps in steps S218 and S225 of the print-related job processing. However, the present invention is not limited thereto. For example, step S225 may be deleted, only the information acquired in step S218 of the print-related job processing may be saved as the operation log data, and the remaining information may not be saved. Further, for example, when the access to the log save server 4 is successful, the printing operation may be continued without writing in step S218 or determination in step S219, and all the operation log data may be saved in step S225. Further, instead of performing the access confirmation to the log save server 5 and the start of the printing operation in parallel in step S212, the access confirmation may be performed first and the printing operation may be started when the access has succeeded.

Further, in the scan-related job processing, the timing of confirming (S303) the access to the log save server 4 in the scan-related job may be any timing after the execution instruction is received and before the image data of the first page is output (S329), and is not limited to the timing before the reading of the first page starts. For example, the confirming may be started in parallel to the reading of the document (S311) or after the reading of the document is over (YES in S312).

Further, in the present embodiment, as the log setting 51 shown in FIG. 4, the example where the selection as to whether to save the log for each of the scan function, the copy function and the print function is received has been described. However, the log of at least the scan function may be able to be saved, and the log save functions of the copy function and the print function may not be provided.

Further, in any flowchart disclosed in the embodiment, the plurality of processing in the plurality of arbitrary steps can be arbitrarily changed in terms of execution order or may be executed in parallel as long as the processing contents do not conflict with each other.

Further, the processing disclosed in the embodiment may be executed by hardware such as a single CPU, a plurality of CPUs and an ASCI or a combination thereof. In addition, the processing disclosed in the embodiment can be implemented in various aspects such as a storage medium on which a program for executing the processing is recorded, a method or the like.

What is claimed is:

1. An image processing apparatus comprising a scanner, wherein the image processing apparatus is configured to execute a file output job, in which the file output job is a job of reading a plurality of pages of a document by the scanner, of generating image data of the plurality of pages based on the read document, and of outputting a file including the generated image data to a designated output destination,
wherein the image processing apparatus is configured to save a log relating to the file output job in a server, in a case where the image processing apparatus executes the file output job, and
wherein the image processing apparatus is configured to:
confirm whether or not to be able to access the server, in response to receiving an execution instruction of the file output job via an input interface of the image processing apparatus;
stop execution of the file output job without outputting the file to the designated output destination, in a case where it is confirmed that the image processing apparatus could not access the server;
transmit the log relating to the file output job to the server before outputting the file including the generated image data to the designated output destination, in a case where it is confirmed that the image processing apparatus could access the server;
output the file including the generated image data to the designated output destination, in a case where the transmitted log could be saved in the server; and
stop the execution of the file output job without outputting the file to the designated output destination, in a case where the transmitted log could not be saved in the server.

2. The image processing apparatus according to claim 1, wherein the image processing apparatus is configured to:
confirm whether or not to be able to access the server, before starting the reading of the document, in response to receiving the execution instruction of the file output job via the input interface of the image processing apparatus;
stop the execution of the file output job without starting the reading of the document, in the case where it is confirmed that the image processing apparatus could not access the server;
start the reading of the document, generate the image data, and transmit the log relating to the file output job to the server before outputting the file including the generated image data, in the case where it is confirmed that the image processing apparatus could access the server;
output the file including the generated image data to the designated output destination, in the case where the transmitted log could be saved in the server; and
stop the execution of the file output job without outputting the file to the designated output destination, in the case where the transmitted log could not be saved in the server.

3. The image processing apparatus according to claim 1, wherein the image processing apparatus is configured to store a common parameter, which is commonly used for access to the server, in a memory of the image processing apparatus, in which the common parameter includes access information for accessing the server, and
wherein the image processing apparatus is configured to:
confirm whether or not to be able to access the server with using the common parameter stored in the memory, in response to receiving the execution instruction of the file output job via the input interface of the image processing apparatus;
stop the execution of the file output job without outputting the file to the designated output destination, in the case where it is confirmed that the image processing apparatus could not access the server;
transmit the log relating to the file output job to the server with using the common parameter stored in the memory, before outputting the file including the generated image data to the designated output destination, in the case where it is confirmed that the image processing apparatus could access the server;
output the file including the generated image data to the designated output destination, in the case where the transmitted log could be saved in the server; and
stop the execution of the file output job without outputting the file to the designated output destination, in the case where the transmitted log could not be saved in the server.

4. The image processing apparatus according to claim 3, wherein the image processing apparatus is configured to display a setting screen for setting the common parameter on a display, and to store the common parameter input to the image processing apparatus in the memory of the image processing apparatus, the common parameter being input via the setting screen, and wherein the image processing apparatus is configured to:
confirm whether or not to be able to access the server with using the common parameter stored in the memory, in response to receiving the execution instruction of the file output job via the input interface of the image processing apparatus;
stop the execution of the file output job without outputting the file to the designated output destination, in the case where it is confirmed that the image processing apparatus could not access the server;
transmit the log relating to the file output job to the server with using the common parameter stored in the memory, before outputting the file including the generated image data to the designated output destination, in the case where it is confirmed that the image processing apparatus could access the server;
output the file including the generated image data to the designated output destination, in the case where the transmitted log could be saved in the server; and
stop the execution of the file output job without outputting the file to the designated output destination, in the case where the transmitted log could not be saved in the server.

5. The image processing apparatus according to claim 3, wherein the image processing apparatus is configured to store an output destination parameter, which is used for outputting the file to the designated output destination, in the memory of the image processing apparatus, separately from the common parameter, in which the output destination parameter includes storage information indicating a storage that is an output destination of the file, and wherein the image processing apparatus is configured to:
confirm whether or not to be able to access the server with using the common parameter stored in the memory, in response to receiving the execution instruction of the file output job via the input interface of the image processing apparatus;
stop the execution of the file output job without outputting the file to the designated output destination, in the case where it is confirmed that the image processing apparatus could not access the server;
transmit the log relating to the file output job to the server with using the common parameter stored in the memory, before outputting the file including the generated image data to the designated output destination, in the case where it is confirmed that the image processing apparatus could access the server;
output, to the designated output destination, the file including the generated image data with using the output destination parameter stored in the memory, in the case where the transmitted log could be saved in the server; and
stop the execution of the file output job without outputting the file to the designated output destination, in the case where the transmitted log could not be saved in the server.

6. The image processing apparatus according to claim 5, wherein the image processing apparatus is configured to store a plurality of the output destination parameters in the memory, and
wherein the image processing apparatus causes a display to display a selection screen for selecting one of the output destination parameters, and stores the selected output destination parameter in the memory of the image processing apparatus, the selected output destination parameter being selected via the selection screen.

7. The image processing apparatus according to claim 6, wherein a plurality of job profiles are registered in the image processing apparatus,
wherein the output destination parameter and a file generation parameter for generating the file are associated with each of the plurality of job profiles,
wherein the selection screen is displayed for selecting one of the registered job profiles, and
wherein the image processing apparatus stores the output destination parameter included in the selected job profile in the memory of the image processing apparatus.

8. The image processing apparatus according to claim 3, wherein the image processing apparatus is configured to execute a print output job, in which the print output job is a job of generating the image data of a plurality of pages indicating a raster image for print and of printing out the raster image indicated by the generated image data,
wherein the image processing apparatus is configured to save a log relating to the print output job in the server, in a case where the image processing apparatus executes the print output job,
wherein in a case where the image processing apparatus executes the print output job, the image processing apparatus is configured to:
confirm whether or not to be able to access the server with using the common parameter stored in the memory, before starting a printout of the raster image indicated by the generated image data;
transmit the log relating to the print output job to the server and start the printout of the raster image indicated by the generated image data, in the case where it is confirmed that the image processing apparatus could access the server; and
stop the execution of the print output job without starting the printout of the raster image indicated by the generated image data, in the case where it is confirmed that the image processing apparatus could not access the server, and
wherein in a case where the image processing apparatus executes the file output job, the image processing apparatus is configured to:
confirm whether or not to be able to access the server with using the common parameter stored in the memory, in response to receiving the execution instruction of the file output job via the input interface of the image processing apparatus;
stop the execution of the file output job without outputting the file to the designated output destination, in the case where it is confirmed that the image processing apparatus could not access the server; and
transmit the log relating to the file output job to the server with using the common parameter stored in the memory, before outputting the file including the generated image data to the designated output destination, in the case where it is confirmed that the image processing apparatus could access the server.

9. The image processing apparatus according to claim 1, wherein the image processing apparatus is configured to:
confirm whether or not to be able to access the server, in response to receiving the execution instruction of the file output job via the input interface of the image processing apparatus;

stop the execution of the file output job without outputting the file to the designated output destination, in the case where it is confirmed that the image processing apparatus could not access the server;
transmit, to the server, a parameter used for the reading and data based on the generated image data as the log relating to the file output job, before outputting the file including the generated image data to the designated output destination, in the case where it is confirmed that the image processing apparatus could access the server;
output the file including the generated image data to the designated output destination, in the case where the transmitted log could be saved in the server; and
stop the execution of the file output job without outputting the file to the designated output destination, in the case where the transmitted log could not be saved in the server.

* * * * *